US007076413B2

(12) United States Patent
Zhang et al.

(10) Patent No.: US 7,076,413 B2
(45) Date of Patent: Jul. 11, 2006

(54) SIMULATION RESULT DISPLAYING APPARATUS FOR A PNEUMATIC DEVICE AND RECORD OF DISPLAYED RESULT

(75) Inventors: Huping Zhang, Toride (JP); Mitsuru Senoo, Kitasouma-gun (JP); Naotake Oneyama, Kashiwa (JP)

(73) Assignee: SMC Kabushiki Kaisha, Tokyo (JP)

( * ) Notice: Subject to any disclaimer, the term of this patent is extended or adjusted under 35 U.S.C. 154(b) by 781 days.

(21) Appl. No.: 09/987,740

(22) Filed: Nov. 15, 2001

(65) Prior Publication Data

US 2002/0091505 A1    Jul. 11, 2002

(30) Foreign Application Priority Data

Nov. 16, 2000    (JP)    ............................. 2000-349630

(51) Int. Cl.
G06G 7/48    (2006.01)
G06F 17/10    (2006.01)
(52) U.S. Cl. .............................................. 703/7; 703/2
(58) Field of Classification Search ................ 703/2, 703/13, 18, 6, 7
See application file for complete search history.

(56) References Cited

U.S. PATENT DOCUMENTS 4,696,264 A * 9/1987 Vondernau et al. ....... 123/73 V
5,315,530 A   5/1994 Gerhardt et al.
5,433,125 A * 7/1995 Muller .................... 74/473.11
6,129,002 A * 10/2000 Lisec et al. .................. 91/454

FOREIGN PATENT DOCUMENTS

| EP | 1 011 038 A2 | 6/2000 |
| JP | 59 121203 | 7/1984 |
| JP | 4-55984 | 2/1992 |
| JP | 2000-179503 | * 6/2000 |
| JP | 2000-179503 | 6/2001 |
| JP | 2001-227505 | 8/2001 |

OTHER PUBLICATIONS

"PneuSim Pro", May 12, 2000, Famic Technologies Inc., Product Specification. pp. 1-5.*
Yukio Terashima, Yukio kawkami, Tsuyoshi Arinaga, Sunao Kawai, "An Approach for Energy-saving of Pneumatic Cylinder by Meter-in Circuit", May 16, 2000, School of Science and Engineering, Waseda University Tokyo Japan., pp. 1-7.*
R.Richardson, A.R. Plumemr, M.Brown, "Modeling and simulation of Pneumatic cylinders for a physiotherapy robot", Jan. 2000, School of mechanical Engineering, University of Leeds, UK.*

(Continued)

Primary Examiner—Russell Frejd
(74) Attorney, Agent, or Firm—Paul A. Guss

(57) ABSTRACT

A stroke time of a piston from excitation of a solenoid valve for driving the piston of a pneumatic cylinder to arrival at an end position thereof and a velocity of the piston at the arrival of the piston at the end position are determined by a simulation calculating unit for several load rates of the pneumatic cylinder for a plurality of determined combinations of the solenoid valve, a speed controller, the pneumatic cylinder, and tubes for connecting therebetween. The stroke time and velocity of the piston determined by the simulation calculating unit for each of the load rates for each of the plurality of combinations are displayed in a superimposed manner on a display unit with a display control means based on a stroke of the pneumatic cylinder.

3 Claims, 10 Drawing Sheets

OTHER PUBLICATIONS

S.J.M. Cartaxo and S.C.S. Rocha, "Object-oriented simulation of pneumatic conveying application to a turbulent flow", Aug. 22, 1999, Brazilian Journal of Chemical Engineering, pp. 1-14.*

Luis Tokashiki et al., "Simulation on Pneumatic Cylinder Including Pipes," Hydraulic Pressure and Pneumatic Pressure, vol. 28, No. 7, Nov. 1997, pp. 766-771.

Note: Partial translation in the form of an abstract has been provided for JP 2000-179503. Partial translations of relevant portions have been provided for JP 2001-227505 and Tokashiki et al. citations.

Hiroyuki Nakajima, "Pneumatic Applied Mechanism and Circuit Design," Nikkan Kogyo Shimbun, Ltd., 2nd Edition, Jun. 30, 1971, pp. 48-51.

* cited by examiner

FIG. 2

| LOAD RATE | RATED STROKE | | | | | | | |
|---|---|---|---|---|---|---|---|---|
| 10% | 50mm | 100mm | 150mm | 200mm | 250mm | 300mm | 350mm | 400mm |
| 30% | 50mm | 100mm | 150mm | 200mm | 250mm | 300mm | 350mm | 400mm |
| 50% | 50mm | 100mm | 150mm | 200mm | 250mm | 300mm | 350mm | 400mm |
| 70% | 50mm | 100mm | 150mm | 200mm | 250mm | 300mm | 350mm | 400mm |

SIMULATION RESULT DISPLAYING APPARATUS FOR A PNEUMATIC DEVICE AND RECORD OF DISPLAYED RESULT

BACKGROUND OF THE INVENTION

1. Field of the Invention

The present invention relates to a simulation result displaying apparatus for a pneumatic device and a record of a displayed result, in which the stroke time and the velocity of a piston are displayed in a superimposed manner based on the result of numerical simulation for the operation of the pneumatic device.

2. Description of the Related Art

A variety of methods have been suggested to select the pneumatic device by simulating the operation of the pneumatic device including a pneumatic cylinder.

One of the selection methods is disclosed in Japanese Laid-Open Patent Publication No. 2000-179503.

In this method, data concerning pneumatic actuators, solenoid valves, flow controllers, tubes, fittings and exhaust treatment devices is stored in a pneumatic actuator database, a solenoid valve database, a flow controller database, a tube database, a fitting database and an exhaust treatment device database, respectively, for each item number or the like. Conditions required for pneumatic devices constituting a system are calculated, and pneumatic devices conforming to the calculated conditions are selected from the respective databases. At the first step, a pneumatic actuator satisfying a load condition, a strength condition and a velocity condition is selected from the pneumatic actuator database based on a calculation according to a basic equation. At the second step, a solenoid valve and an exhaust treatment device, each of which satisfies a discriminant concerning the velocity condition, are selected from the respective databases. At the third step, a flow controller, a tube and a fitting, each of which satisfies a discriminant concerning the velocity condition, are selected from the respective databases.

When the conventional selection method described above is used, it is necessary that the data of item numbers or the like relating to the pneumatic actuator, the solenoid valve, the driving control apparatus, the tube, the fitting, and the exhaust treatment device is previously stored in the pneumatic actuator database, the solenoid valve database, the driving control apparatus database, the tube database, the fitting database, and the exhaust treatment device database.

Further, in order to select the pneumatic device, the following is necessary. The pneumatic actuator satisfying the load condition, the strength condition, and the velocity condition, is selected from the pneumatic actuator database based on the calculation in accordance with the basic equation. The solenoid valve satisfying the discriminant of the velocity condition is selected from the solenoid valve database, and the exhaust treatment device is selected from the exhaust treatment device database. The driving control apparatus, the tube, and the fitting, which satisfy the discriminant of the velocity condition, are selected from the driving control apparatus database, the tube database, and the fitting database respectively. Every time the selection is made, the calculation must be performed based on the basic equation. Furthermore, it is judged whether or not the discriminant of the velocity condition is satisfied. The processing for the selection is extremely complicated, and it is impossible to select the pneumatic device with ease.

SUMMARY OF THE INVENTION

An object of the present invention is to provide a simulation result displaying apparatus for a pneumatic device and a record of a displayed result, in which it is possible to select the combination of pneumatic devices with ease.

In a simulation result displaying apparatus for a pneumatic device, the pneumatic device at least including a pneumatic cylinder, a solenoid valve, a speed controller, and pneumatic tubes for connecting therebetween, comprising: means for inputting a piston area of a head-end chamber of the pneumatic cylinder, a piston area of a piston rod-end chamber of the pneumatic cylinder, and an effective area of a head-end tube passage of the pneumatic cylinder and an effective area of a rod-end tube passage of the pneumatic cylinder based on an effective area of the solenoid valve, an effective area during free flow and an effective area during controlled flow of the speed controller, and effective areas of the pneumatic tubes; means for calculating by a simulation a stroke time of a piston from valve excitation of the solenoid valve for driving the piston of the pneumatic cylinder to arrival at an end position of the piston of the pneumatic cylinder and a velocity of the piston on the arrival at the end position of the piston for each of load rates of the pneumatic cylinder based on at least the piston area of the head-end chamber, the piston area of the piston rod-end chamber, the effective area of the head-end tube passage of the pneumatic cylinder, and the effective area of the rod-end tube passage of the pneumatic cylinder inputted by the input means for each of a plurality of combinations of the solenoid valve, the speed controller, the pneumatic cylinder, and the tubes for connecting therebetween; and means for displaying, in a superimposed manner on a display unit, the stroke time of the piston and the velocity of the piston determined by the calculating means for each of the load rates for each of the plurality of combinations based on a stroke of the piston.

In a record of a displayed result of a simulation of a pneumatic device, having data comprising a stroke time of a piston from excitation of a solenoid valve for driving the piston of a pneumatic cylinder to arrival at an end position of the piston of the pneumatic cylinder and a velocity of the piston at the arrival at the end position of the piston for each of load rates of the pneumatic cylinder for each of a plurality of previously determined combinations of the solenoid valve, a speed controller, the pneumatic cylinder, and tubes for connecting therebetween, the stroke time and the velocity being recorded in a superimposed manner for each of the load rates for each of the plurality of combinations based on a stroke of the pneumatic cylinder.

Therefore, according to the simulation result displaying apparatus for the pneumatic device and the record of the displayed result in the present invention, the display contents displayed by the simulation result displaying apparatus for the pneumatic device and the record of the displayed result are used to know whether or not the piston arrives at the end position at a desired time and whether or not the velocity of the piston at the end position is a desired velocity for the previously determined plurality of combinations of the solenoid valve, the speed controller, the pneumatic cylinder, and the tubes for connecting therebetween. It is possible to easily judge a desired combination from the previously determined plurality of combinations of the solenoid valve, the speed controller, the pneumatic cylinder, and the tubes for connecting therebetween.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 2 illustrates combinations of load ratios and strokes of a pneumatic cylinder for simulating the operation of the pneumatic device according to the embodiment of the present invention;

DESCRIPTION OF THE PREFERRED EMBODIMENTS

The simulation result displaying apparatus for the pneumatic device and the record of the displayed result according to the present invention will be explained below in accordance with an embodiment.

Figure 1:
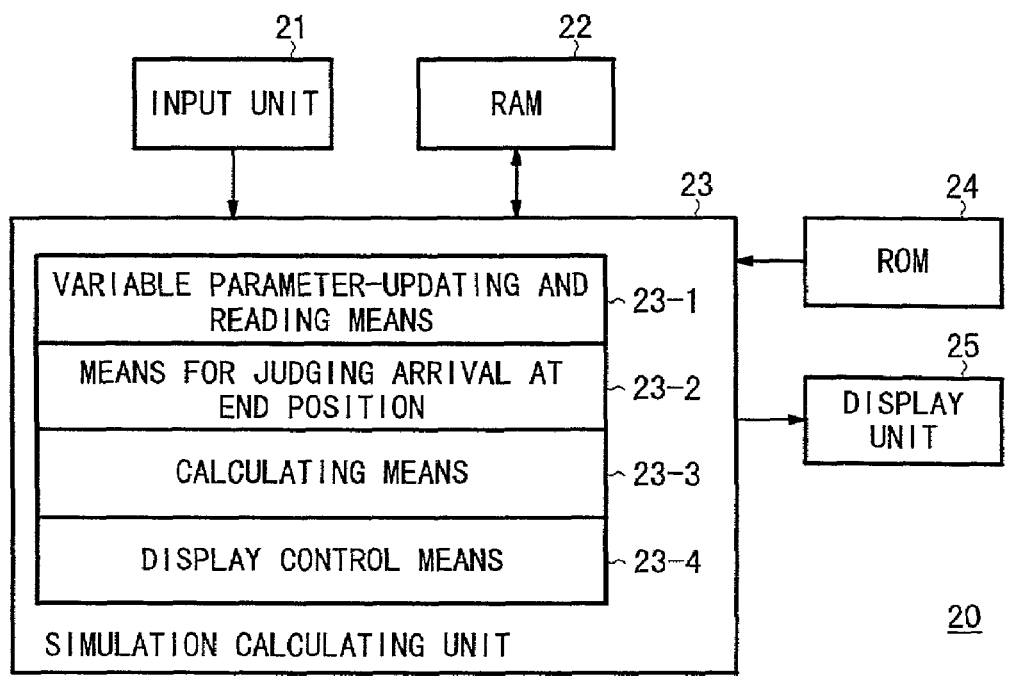
FIG. 1 is a block diagram illustrating a simulator for simulating the operation of a pneumatic device according to an embodiment of the present invention.
Figure 3:
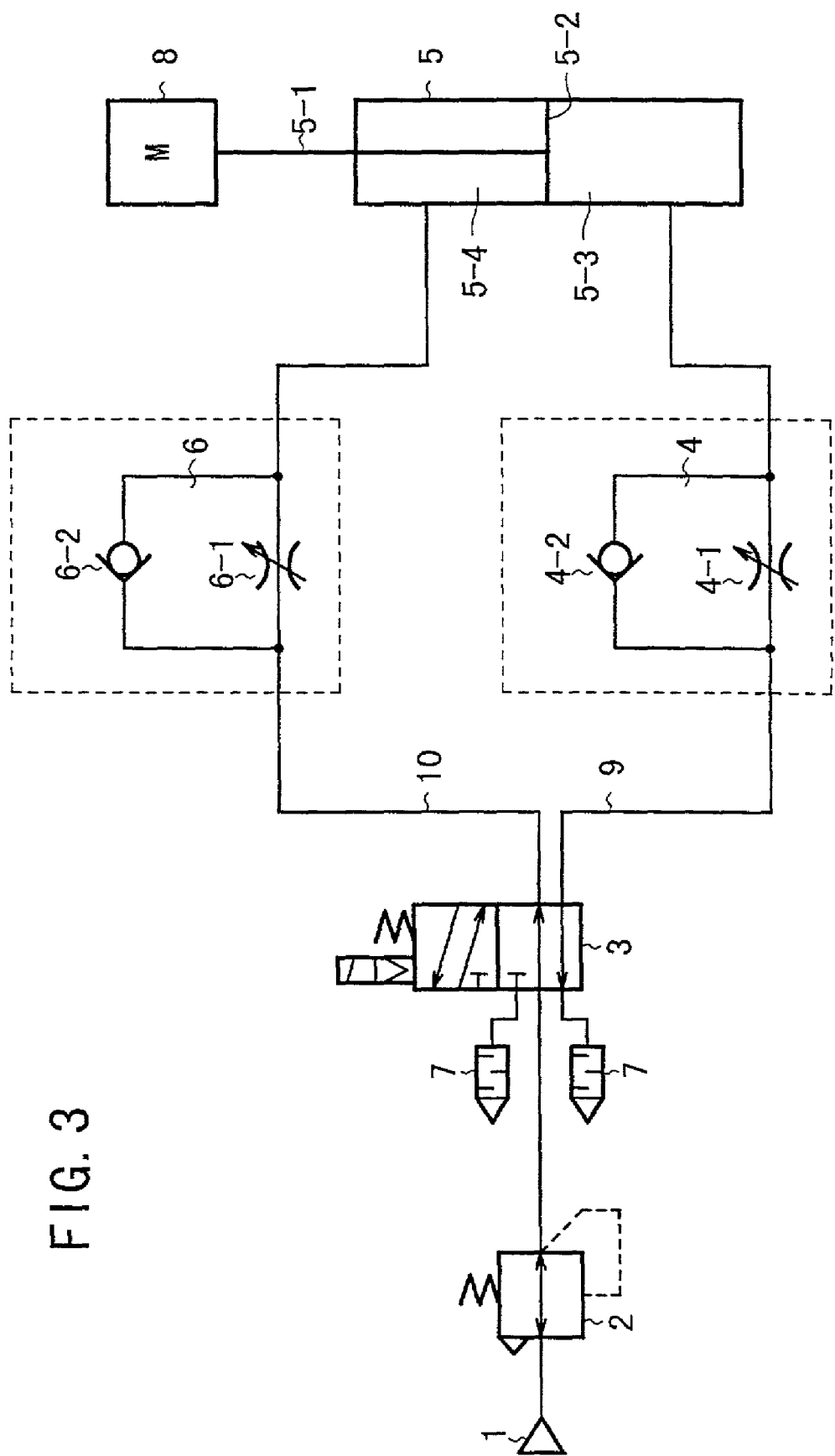
FIG. 3 shows a configuration illustrating a system to be simulated by a simulation result displaying apparatus for the pneumatic device according to the embodiment of the present invention.

FIG. 1 shows a block diagram illustrating a simulator for simulating operation of a pneumatic device according to an embodiment of the present invention, and FIG. 3 shows a configuration illustrating a system (referred to as "pneumatic device system" as well) to be simulated by a simulation result displaying apparatus for the pneumatic device according to the embodiment of the present invention.

As shown in FIG. 3, the system to be simulated by the simulation result displaying apparatus for the pneumatic device according to the embodiment of the present invention is constructed as follows. The supply air outputted from a pneumatic pressure source 1 is controlled to have a constant pneumatic pressure by an automatic pressure reducing valve 2. The output air controlled by the automatic pressure reducing valve 2 is fed via a solenoid valve 3. The output air from the solenoid valve 3 is supplied to a head-end chamber 5-3 (referred to as "charging chamber" as well) of a pneumatic cylinder 5 of the one-side rod type as an actuator through a speed controller 4. The speed controller 4 is a driving control apparatus comprising a variable restriction 4-1 and a check valve 4-2 connected in parallel. The discharge air fed from a piston rod-end chamber 5-4 (referred to as "discharging chamber" as well) of the pneumatic cylinder 5 is supplied to the solenoid valve 3 to feed the air from the solenoid valve 3 through a speed controller 6. The speed controller 6 is a driving control apparatus comprising a variable restriction 6-1 and a check valve 6-2 connected in parallel. The discharge air from the pneumatic cylinder 5 fed from the solenoid valve 3 is discharged to the atmosphere via a silencer 7 which is an exhaust treatment device.

In this case, in FIG. 3, for example, the pneumatic cylinder 5 is provided vertically with the piston rod disposed at the top. A cylinder load 8 having a mass M is provided as a load (load for the pneumatic cylinder 5 or simply referred to as "load") for the piston 5-2 of the pneumatic cylinder 5. The speed controller 4 is directly connected to a head-end air connection port of the pneumatic cylinder 5 in order to shorten the tube distance. The speed controller 6 is also directly connected to a piston rod-end air connection port of the pneumatic cylinder 5 in order to shorten the tube distance. Variable restrictions 4-1, 6-1 of the speed controllers 4, 6 are set to be fully open. The speed controller 4 passes the free flow, and the speed controller 6 passes the controlled flow. The reference numeral 9 indicates a pneumatic tube for connecting the solenoid valve 3 and the speed controller 4. The reference numeral 10 indicates a pneumatic tube for connecting the speed controller 6 and the solenoid valve 3.

The operation of the pneumatic device according to the embodiment of the present invention is simulated by changing several parameters such as the effective area of the solenoid valve 3, the inner diameters and the lengths of the pneumatic tubes 9, 10, the effective areas of the speed controllers 4, 6, the inner diameter of the pneumatic cylinder 5, the effective area of the piston rod 5-1 of the pneumatic cylinder 5, the stroke of the piston 5-2, and the effective area of the silencer 7.

Next, explanation will be made for a block diagram of the simulator for performing the simulation of operation of the pneumatic device according to the embodiment of the present invention.

As shown in FIG. 1, the simulator 20 is provided with an input unit 21 for setting the output pneumatic pressure Ps of the automatic pressure reducing valve 2, the air temperature θ, the gas constant R, the angle of installation δ0 of the pneumatic cylinder 5, the mass M of the load 8 for the pneumatic cylinder 5, the frictional force Fr during the motion of the piston 5-2 of the pneumatic cylinder 5, the piston area Acu of the head-end chamber 5-3 of the pneumatic cylinder 5, and the piston area Acd of the piston rod-end chamber 5-4 of the pneumatic cylinder 5 (=Acu−effective area of the piston rod 5-1). The input unit 21 further sets the effective area Seh of the head-end tube passage of the pneumatic cylinder 5 determined by serial combination based on the effective area of the solenoid valve 3, the effective area of the speed controller 4, and the effective area of the pneumatic tube 9; and the effective area Ser of the rod-end tube passage of the pneumatic cylinder 5 determined by serial combination based on the effective area of the solenoid valve 3, the effective area of the speed controller 6, the effective area of the silencer 7, and the effective area of the pneumatic tube 10.

The simulator 20 further comprises a RAM 22, a ROM 24, a simulation calculating unit 23, and a display unit 25. The RAM 22 includes a working area as well as a table area to store a variable parameter table obtained by combining the load rate (also referred to as "load ratio") α of the pneumatic cylinder 5 and the rated stroke of the piston 5-2 for each of rated piston areas of the pneumatic cylinder 5 as shown in FIG. 2. The ROM 24 stores an operation program. The simulation calculating unit 23 as a CPU for performing simulation calculation with reference to the variable parameter table stored in the RAM 22 based on the program stored in the ROM 24. The display unit 25 as an output unit displays, in a superimposed manner, the time required from the excitation of the solenoid valve 3 until the arrival at the end position of the piston 5-2 and the velocity of the piston 5-2 when the piston 5-2 arrives at the end position, as the results of calculation performed by the simulation calculating unit 23 based on the stroke of the pneumatic cylinder 5.

A detailed example of the variable parameter table stored in the RAM 22 is shown in FIG. 2. FIG. 2 illustrates cases in which the load rates α are 10%, 30%, 50%, and 70% when the total load rate of the pneumatic cylinder 5 is 100%, and the rated strokes of the piston 5-2 are 50 mm, 100 mm, 150 mm, 200 mm, 250 mm, 300 mm, 350 mm, and 400 mm for individual rated piston areas of the pneumatic cylinder 5. The respective load rates and the rated stroke are used as parameters.

The simulation calculating unit 23 functionally comprises variable parameter-updating and reading means 23-1, judging means 23-2, calculating means 23-3, and display control means 23-4. The variable parameter-updating and reading means 23-1 reads the combination of different parameters in the variable parameter table. The judging means 23-2 judges whether or not the piston 5-2 arrives at the end position of the piston 5-2 (hereinafter simply referred to also "end position") as the read rated stroke. The calculating means 23-3 calculates, by a simulation, the time until arrival of the piston 5-2 of the pneumatic cylinder 5 at the end position and the velocity of the piston 5-2 at the end position. The display control means 23-4 displays, in a superimposed manner, the calculated arrival time and the calculated velocity obtained by the calculating means 23-3 on the display unit 25 for each load rate based on the stroke of the pneumatic cylinder 5.

Figure 4:
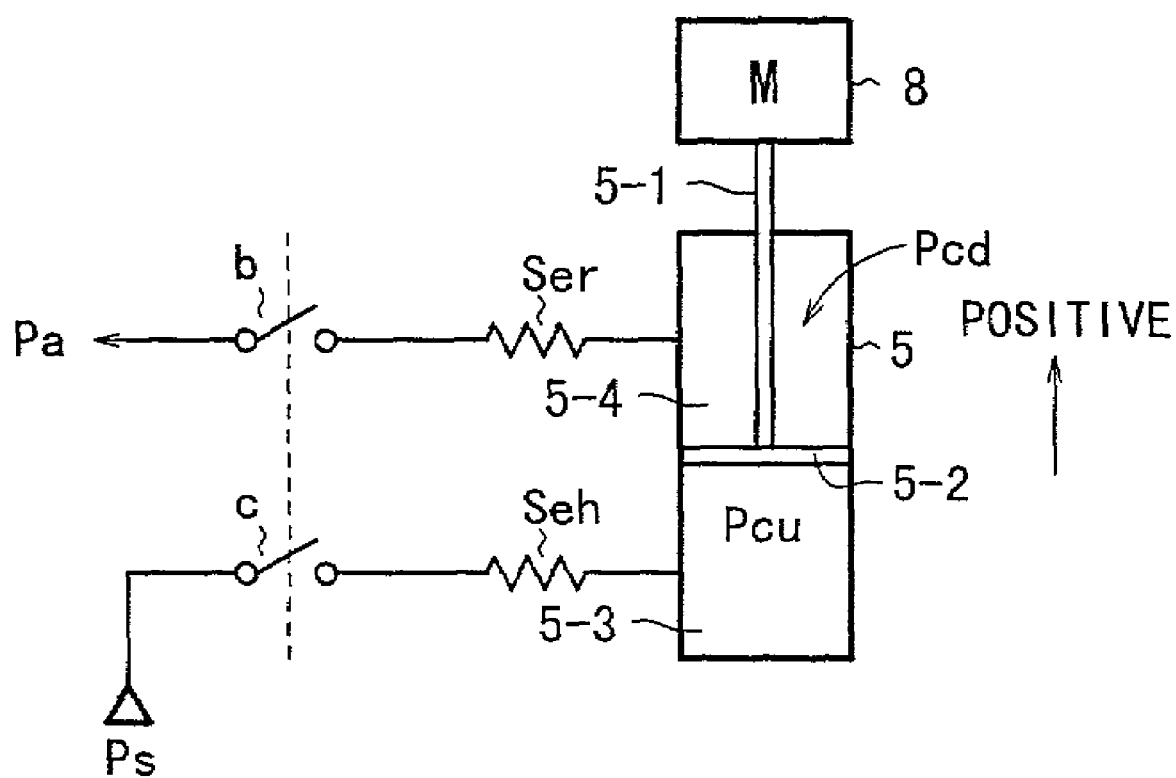
FIG. 4 shows a schematic drawing equivalently illustrating the system to be simulated by the simulation result displaying apparatus for the pneumatic device according to the embodiment of the present invention.

The pneumatic device system shown in FIG. 3 is equivalently shown in FIG. 4. The system may be represented by switching contacts b, c based on ON and OFF of the solenoid valve 3, the resistance based on the equivalent effective area Seh of the cylinder head-end tube passage, and the resistance based on the equivalent effective area Ser of the cylinder rod-end tube passage. The equivalent effective area Seh is obtained by the effective area on the air inflow side of the solenoid valve 3 concerning the air (output pneumatic pressure Ps) from the automatic pressure reducing valve 2, the effective area of the pneumatic tube 9, the effective area of the speed controller 4, and the effective area of the head-end connection port of the pneumatic cylinder 5. The equivalent effective area Ser of the cylinder rod-end tube passage is obtained by the effective area on the air outflow side of the solenoid valve 3, effective area of the pneumatic tube 10, the effective area of the speed controller 6, and the effective area of the piston rod-end connection port of the pneumatic cylinder 5. In this case, the reference Pcu indicates the pneumatic pressure in the head-end chamber 5-3 of the pneumatic cylinder 5, the reference Pcd indicates the pneumatic pressure in the piston rod-end chamber 5-4 of the pneumatic cylinder 5, the reference Pa indicates the atmospheric pressure, and an arrow indicates the positive movement direction of the pneumatic cylinder piston 5-2.

Figure 5:
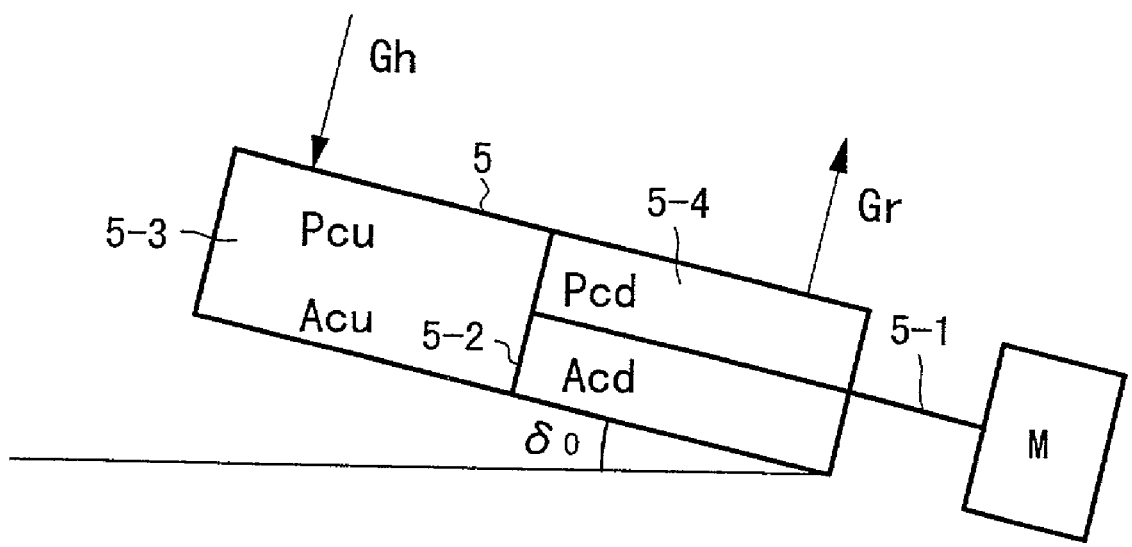
FIG. 5 shows a schematic drawing illustrating a position of installation of a pneumatic cylinder of the pneumatic device according to the embodiment of the present invention.

The pneumatic cylinder 5 is generally shown in FIG. 5, taking the position of installation thereof into consideration. In FIG. 5, the reference δ0 indicates the angle formed by the horizontal position and the piston rod 5-1, the reference Acu indicates the piston area of the pneumatic cylinder 5 of the head-end chamber 5-3, the reference Acd indicates the piston area of the piston rod-end chamber 5-4 of the pneumatic cylinder 5, the reference Gh indicates the air mass flow rate to the head-end chamber 5-3 of the pneumatic cylinder 5, and the reference Gr indicates the air mass flow rate out of the piston rod-end chamber 5-4 of the pneumatic cylinder 5.

Figure 6:
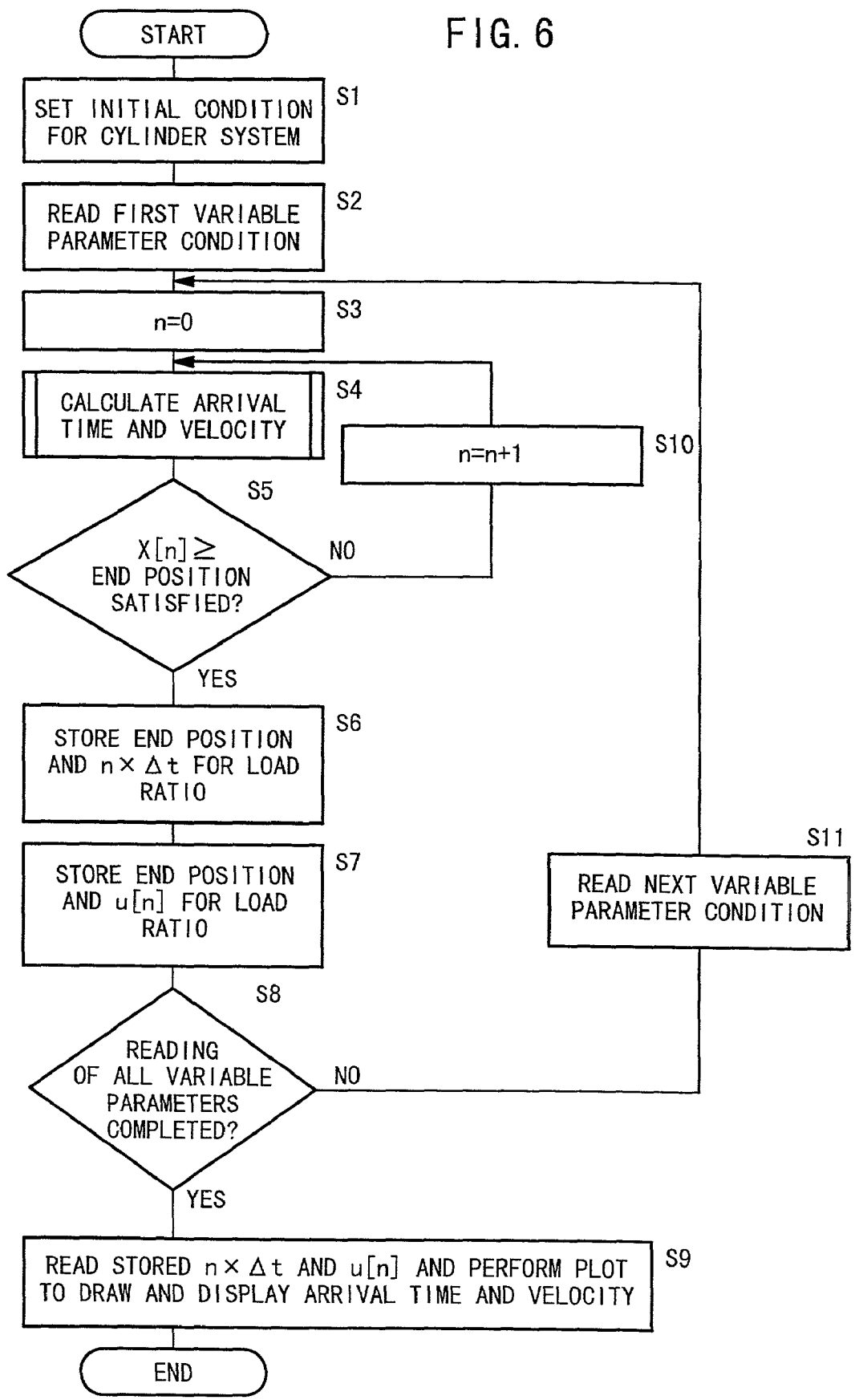
FIG. 6 is a flow chart for determining the time of arrival at the end position of a piston and the velocity of the piston at the end position according to the embodiment of the present invention.
Figure 7:
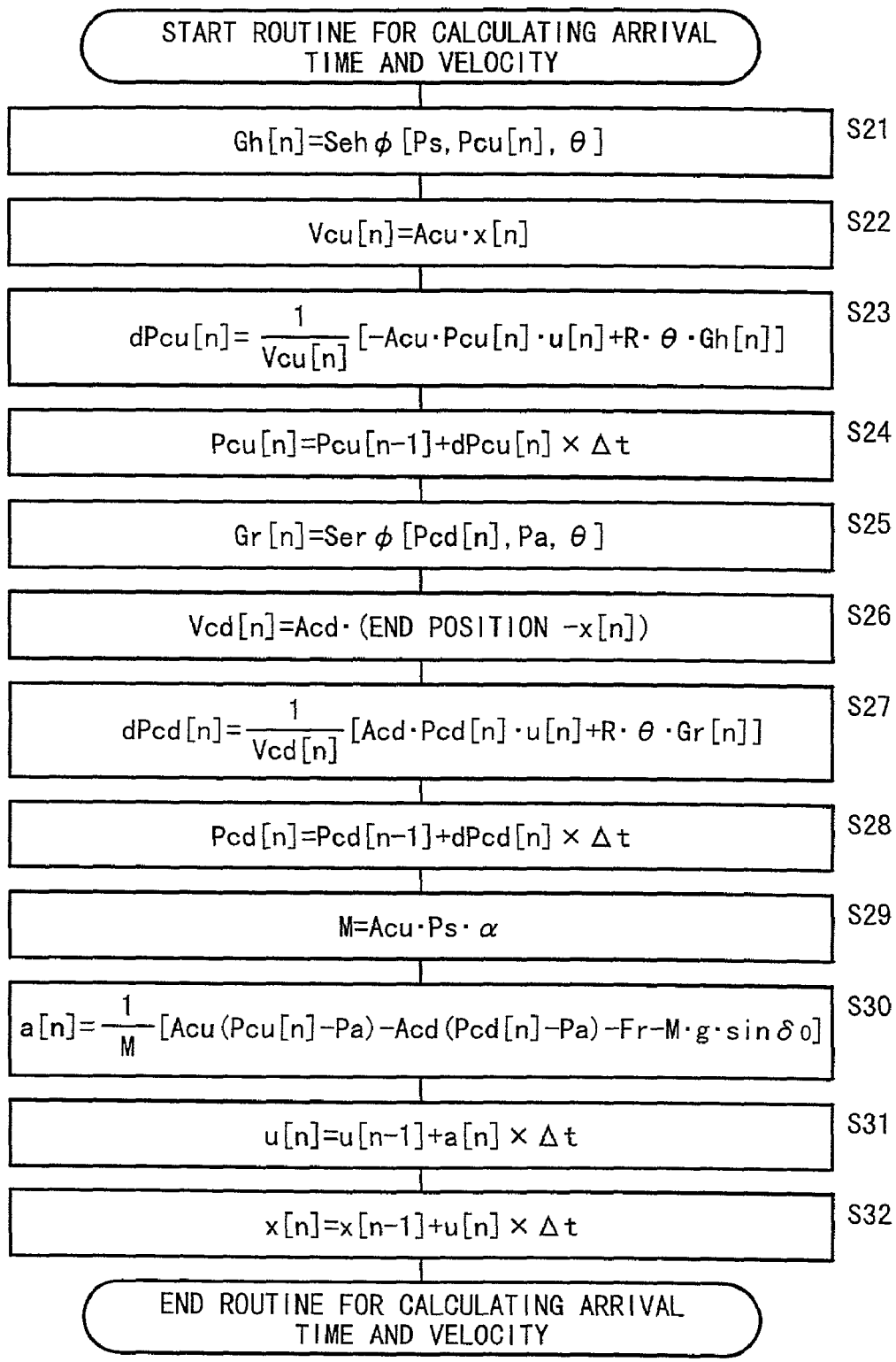
FIG. 7 is a flow chart for determining the time of arrival at the end position of the piston and the velocity of the piston at the end position according to the embodiment of the present invention.

Concerning the pneumatic device combined as described above, explanation will be made based on flow charts shown in FIGS. 6 and 7 for a simulation program for determining the arrival time from the excitation of the solenoid valve 3 to the arrival of the piston 5-2 at the end position and the velocity of the piston 5-2 at the end position.

When the simulation program is started, the inner diameter of the pneumatic cylinder 5, the diameter and the stroke of the piston rod, and the effective area determined by the serial combination equation from the effective areas during the free flow and the controlled flow of the speed controllers 4, 6, the effective areas of the air inflow-side chamber and the outflow-side chamber of the solenoid valve 3, the effective areas of the pneumatic tubes 9, 10, and the effective area of the silencer 7 are set as the initial condition from the input unit 21 (step S1).

Subsequent to step S1, the first variable parameter condition is read from the variable parameter table in the RAM 22 under the control of the variable parameter-updating and reading means 23-1 (step S2). The initial variable parameter is given such that the load rate is 10%, and the rated stroke of the pneumatic cylinder 5 as the end position is 50 mm, for example.

Subsequent to step S2, the variable n is set to zero, and the solenoid valve 3 is excited (step S3). Subsequent to step S3, the arrival time and the velocity are calculated under the control of the calculating means 23-3 (step S4). Step S4 will be described later on, based on FIG. 7.

Subsequent to step S4, it is examined whether or not the displacement x[n] shows that the piston 5-2 is positioned at the end position (step S5). If it is judged in step S5 that the displacement x[n] does not correspond to the end position, the increment of the variable n, i.e., n=n+1 is executed after step S5 (step S10). The routine is executed again from step S4 until it is judged that the displacement x[n] corresponds to the end position.

If it is judged in step S5 that the displacement x[n] shows that the piston 5-2 is positioned at the end position, then the end position and a value "n×Δt" for the load rate are calculated after step S5, and calculated results are stored (step S6). Subsequent to step S6, the end position of the piston and the velocity u[n] of the piston 5-2 for the load rate are stored (step S7). In this case, the value "n×Δt" indicates the time from the excitation of the solenoid valve 3 for driving the piston 5-2 to the arrival of the piston 5-2 at the end position thereof.

Subsequent to step S7, it is examined whether or not all of the variable parameters shown in FIG. 2 are read (step S8). If it is judged that all of the variable parameters are not read in step S8, then the next variable parameter condition is read (step S11). The routine is repeatedly executed from step S3 after step S11 until it is judged in step S8 that all of the variable parameters are read.

Therefore, if it is judged in step S8 that all of the variable parameters are read, the value "n×Δt" as the arrival time and the velocity u[n] of the piston 5-2 at the end position stored for the piston 5-2 and the load rate α are read. The arrival time and the velocity are plotted with respect to the end position of the piston 5-2 and the load rate α, and the arrival time and the velocity of the piston 5-2 are drawn by smoothly connecting the plots on the display unit 25 under the control of the display control means 23-4 (step S9).

Figure 8:
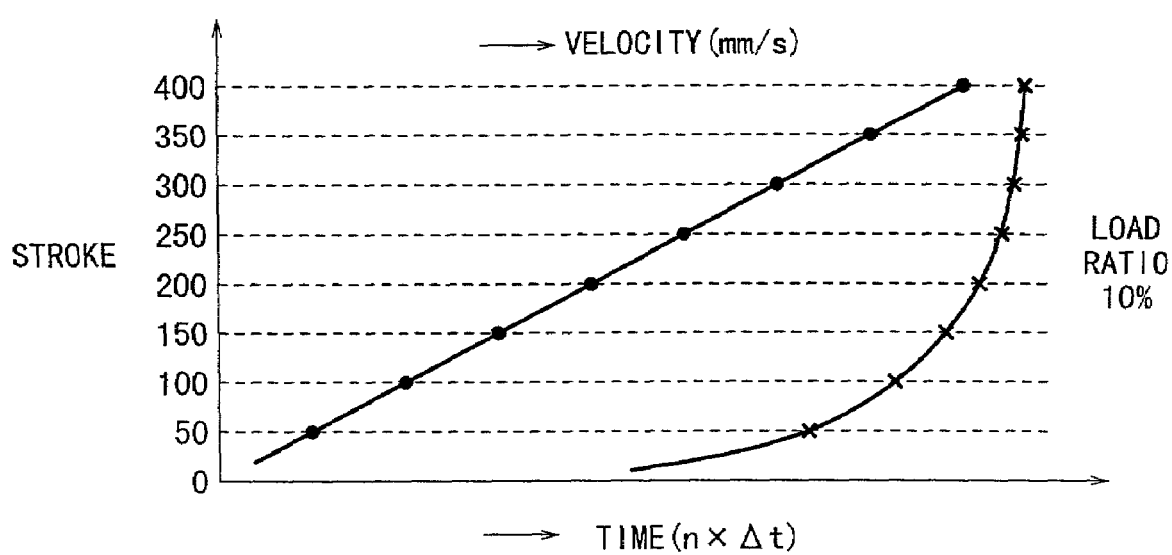
FIG. 8 illustrates a drawing depicting the time until arrival of the piston at the end position and the velocity of the piston at the end position according to the embodiment of the present invention.

Therefore, when step S9 is executed, the time from the excitation of the solenoid valve 3 for driving the piston 5-2 to the arrival of the piston 5-2 at the end position thereof (shown by dots) and the velocity of the piston 5-2 at the end position thereof (shown by "x" marks) are plotted for the respective rated strokes, i.e., 50 mm, 100 mm, 150 mm, 200 mm, 250 mm, 300 mm, 350 mm, and 400 mm in FIG. 8. Further, the time and the velocity for each of the load rates α and for each pneumatic cylinder 5 are plotted. The plotted times and the velocities are individually connected smoothly, and the graph indicated by solid lines in FIG. 8 is displayed on the display unit 25. The display is printed and outputted as a record.

After the completion of the drawing of the time (shown by dots) for movement and the velocity of the piston 5-2 at the end position of the piston 5-2 (shown by "x" marks) for all of the combinations of the variable parameters as described above, the flow chart shown in FIG. 6 is executed again for different combinations of the pneumatic cylinder systems. Thus, the drawing operation is performed based on the time from the excitation of the solenoid valve 3 for driving the piston 5-2 of the pneumatic cylinder 5 to the arrival of the piston 5-2 at the end position and the velocity of the piston 5-2 at the end position thereof, for other combinations of the pneumatic devices as shown in rows (a) and (b) in both of FIGS. 9 and 10.

Figure 9:
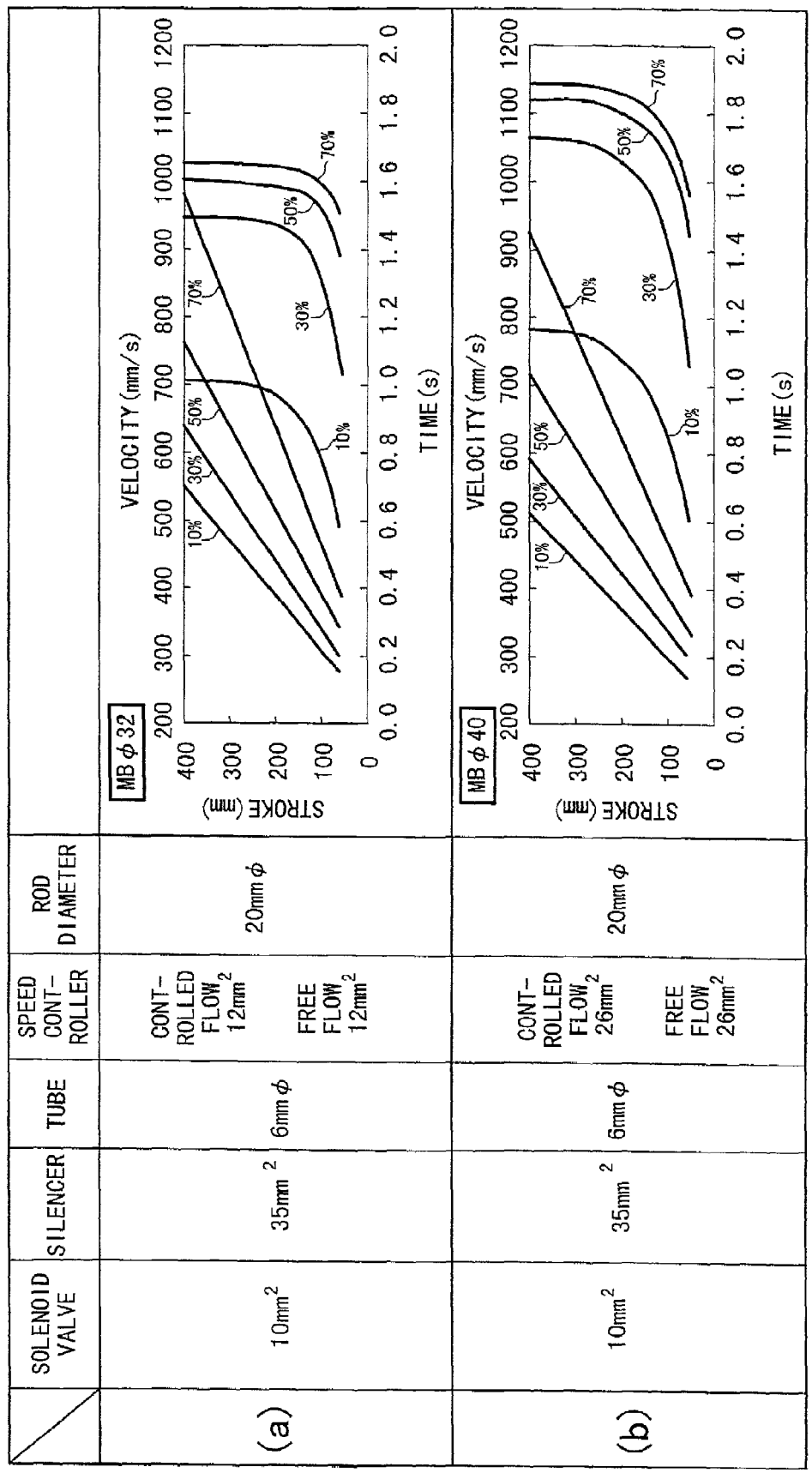
FIG. 9 illustrates drawings depicting the time until arrival of the piston at the end position and the velocity of the piston at the end position according to the embodiment of the present invention.
Figure 10:
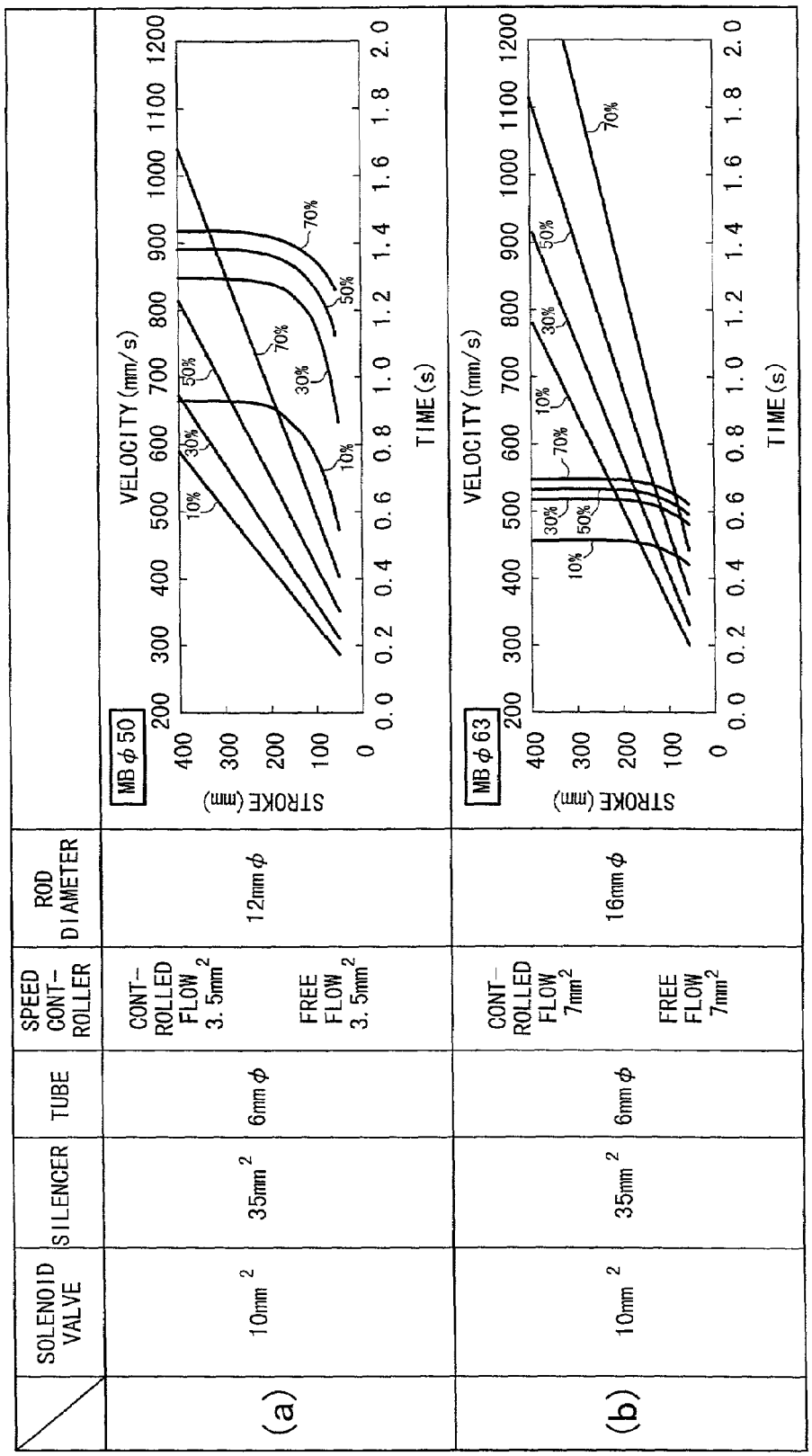
FIG. 10 illustrates drawings depicting the time until arrival of the piston at the end position and the velocity of the piston at the end position according to the embodiment of the present invention.

In FIGS. 9 and 10, indications MBφ32, MBφ40, MBφ50, and MBφ63 show the inner diameters of the pneumatic cylinders 5, respectively.

Next, explanation will be made for the routine for calculating the arrival time and the velocity in step 4 based on FIG. 7.

Prior to this explanation, the symbols and the air mass flow rate Gh into the head-end chamber 5-3 of the pneumatic cylinder etc. will be explained.

The reference θ indicates the air tempe0rature, which is assumed to undergo no change even when the piston 5-2 is moved. The reference R indicates the gas constant; The reference Vcu indicates the volume of the head-end chamber 5-3 of the pneumatic cylinder 5; The reference Vcd indicates the volume of the piston rod-end chamber 5-4 of the pneumatic cylinder 5; The reference Pa indicates the atmospheric pressure; The reference "a" indicates the acceleration of the piston 5-2 of the pneumatic cylinder 5; The reference α indicates the load rate; The reference Fr indicates the friction model; The reference "g" indicates the acceleration of the gravity; and The reference κ indicates the specific heat ratio of the air.

The air mass flow rate Gh to the head-end chamber 5-3 of the pneumatic cylinder 5 is determined as shown in the following expression (1).

$$Gh = Seh\phi(Ps, Pcu, \theta) \quad (1)$$

In this case, φ(Ps, Pcu, θ) is determined in accordance with the following expression (2) if Pcu/Ps>0.528 is satisfied, and it is determined in accordance with the following expression (3) if Pcu/Ps≦0.528 is otherwise satisfied.

$$\varphi = Ps\sqrt{\frac{2\kappa}{R\theta(\kappa-1)}\left\{\left(\frac{Pcu}{Ps}\right)^{\frac{2}{\kappa}} - \left(\frac{Pcu}{Ps}\right)^{\frac{\kappa+1}{\kappa}}\right\}} \quad (2)$$

$$\varphi = Ps\sqrt{\frac{\kappa}{R\theta}\left(\frac{2}{\kappa+1}\right)^{\frac{\kappa+1}{\kappa-1}}} \quad (3)$$

The pneumatic pressure Pcu of the head-end chamber 5-3 of the pneumatic cylinder 5 and the pneumatic pressure Pcd of the piston rod-end chamber 5-4 of the pneumatic cylinder 5 are determined in accordance with the following expressions (4) and (5).

$$Vcu\frac{dPcu}{dt} = -Acu \cdot Pcu \cdot u + R\theta Gh \quad (4)$$

$$Vcd\frac{dPcd}{dt} = Acd \cdot Pcd \cdot u + R\theta Gr \quad (5)$$

The acceleration of the piston 5-2 is determined in accordance with the following expression (6).

$$M\frac{d^2x}{dt^2} = Acu(Pcu - Pa) - Acd(Pcd - Pa) - Fr \quad (6)$$

In this case, it is assumed that the friction model Fr in motion is represented by the sum of the dry frictional force and the viscous frictional force as shown by the following expression (7).

$$Fr = \begin{cases} Fs\left(\frac{dx}{dt} = 0\right) \\ Fc + C\frac{dx}{dt}\left(\frac{dx}{dt} \neq 0\right) \end{cases} \quad (7)$$

The expressions (1) to (7) are known from "Simulation on Pneumatic Cylinder Including Pipes" described in "Hydraulic Pressure and Pneumatic Pressure", Volume 28, No. 7, November, 1997, pp. 766–771. The simulation is performed by utilizing the expressions (1) to (7).

With reference to FIG. 7 again, when the routine for calculating the arrival time and the velocity in step S4 is executed, the air mass flow rate Gh to the head-end chamber 5-3 of the pneumatic cylinder 5 is determined in accordance with the formula: Gh[n]=Sehφ[Ps, Pcu[n], θ] (step S21). Subsequently, the volume Vcu[n] of the head-end chamber 5-3 of the pneumatic cylinder 5 is determined in accordance with the formula: Vcu[n]=Acu·x[n] (step S22). Subsequently, the pressure change dPcu[n] of the head-end chamber 5-3 of the pneumatic cylinder 5 is determined in accordance with the formula: dPcu[n]=(1/Vcu[n])·[−Acu·Pcu[n]·u[n]+R·θ·Gh[n]] (step S23).

In this case, step S22 defines the volume Vcu[n] of the head-end chamber 5-3 of the pneumatic cylinder 5. The reason why step S22 is executed is that the volume Vcu[n] of the head-end chamber 5-3 of the pneumatic cylinder 5 is changed in accordance with the displacement x[n] of the piston 5-2. The reason whey the sign "−" is affixed in step S23 is that the pressure Pcu of the head-end chamber 5-3 of the pneumatic cylinder 5 is decreased (increased), as the volume Vcu of the head-end chamber 5-3 of the pneumatic cylinder 5 is increased (decreased). Step S23 expresses the amount of pressure change of the head-end chamber 5-3 of the pneumatic cylinder 5.

Subsequent to step S23, the pressure Pcu[n] of the head-end chamber 5-3 of the pneumatic cylinder 5 is determined in accordance with the formula: Pcu[n]=Pcu[n−1]+dPcu[n]×Δt (step S24). The calculations in steps S21 to S24 relate to the head-end chamber 5-3 of the pneumatic cylinder 5. Subsequently, the air mass flow rate Gr[n] to the piston rod-end chamber 5-4 of the pneumatic cylinder 5 is determined in accordance with the formula: Gr[n]=Serφ[Pcd[n], Pa, θ] (step S25). Subsequent to step S25, the volume Vcd[n] of the piston rod-end chamber 5-4 of the pneumatic cylinder 5 is determined in accordance with the formula: Vcd[n]=Acd·(end position−x[n]) (step S26).

Subsequent to step S26, the pressure change dPcd[n] of the piston rod-end chamber 5-4 of the pneumatic cylinder 5 is determined in accordance with the formula: dPcd[n]=(1/Vcd[n])·[Acd·Pcd[n]·u[n]+R·θ·Gr[n]] (step S27). The reason why the sign of Acd·Pcd[n]·u[n] is "+" in step S27 is that the pneumatic pressure Pcd of the piston rod-end chamber 5-4 of the pneumatic cylinder 5 is increased, as the volume Vcd of the piston rod-end chamber 5-4 of the pneumatic cylinder 5 is increased.

Subsequent to step S27, the pressure Pcd[n] of the piston rod-end chamber 5-4 of the pneumatic cylinder 5 is determined in accordance with the formula: Pcd[n]=Pcd[n−1]+dPcd[n]×Δt (step S28). The calculations in steps S25 to S28 relate to the piston rod-end chamber 5-4 of the pneumatic cylinder 5.

Subsequently, the load mass M is determined in accordance with the load mass M=Acu·Ps·α (step S29). Subsequent to step S29, the acceleration a[n] of the piston 5-2 is determined in accordance with the formula: a[n]=(1/M)[Acu(Pcu[n]−Pa)−Acd(Pcd[n]−Pa)−Fr−M·g·sin δ0] (step S30).

Subsequent to step S30, the velocity u[n] of the piston 5-2 is determined in accordance with the formula: u[n]=u[n−1]+a[n]×Δt (step S31). As clarified in step S31, the velocity u[n] of the piston 5-2 is determined by integrating the acceleration a[n] of the piston 5-2.

Subsequent to step S31, the displacement x[n] of the piston 5-2 is determined in accordance with the formula: x[n]=x[n−1]+u[n]×Δt (step S32). As clarified in step S32, the displacement x[n] of the piston 5-2 is determined by integrating the velocity u[n] of the piston 5-2.

The execution of step S32 results in completion of the routine for calculating the arrival time and the velocity. Step S5 is executed after step S32 (see FIG. 6). If it is judged that all of the variable parameters are read, "n×Δt" as the arrival time and the velocity u[n] of the piston 5-2 stored for all of the end position and the load rate α are read to plot for the end position and the load rate α. Then, plotted points are smoothly connected to draw the arrival time and the velocity on the display unit 25, for example, as shown in FIGS. 8 and 9 under the control of the display control means 23-4.

Therefore, with reference to FIGS. 9 and 10, it is possible to know, from the display screen and the record of the display screen, the time required for the piston 5-2 to move over the entire stroke and the velocity of the piston 5-2 at the end position, which may be used as a reference to determine a time sequence, making it possible to determine the combination of necessary pneumatic devices with ease.

As explained above, according to the simulation result displaying apparatus for the pneumatic device and the record of the displayed result according to the present invention, it is possible to know the time required for the piston of the pneumatic cylinder to move over the entire stroke and the velocity of the piston at the end position, which may be used as a reference to determine the time sequence. Thus, it is possible to determine the combination of necessary pneumatic devices with ease.

What is claimed is:

1. A simulation result displaying apparatus for a pneumatic device, said pneumatic device at least including a pneumatic cylinder, a solenoid valve, a speed controller, and pneumatic tubes for connecting therebetween, comprising:

means for inputting a piston area of a head-end chamber of said pneumatic cylinder, a piston area of a piston rod-end chamber of said pneumatic cylinder, and an effective area of a head-end tube passage of said pneumatic cylinder and an effective area of a rod-end tube passage of said pneumatic cylinder based on an effective area of said solenoid valve, an effective area during free flow and an effective area during controlled flow of said speed controller, and effective areas of said pneumatic tubes;

means for calculating by a simulation a stroke time of a piston from valve excitation of said solenoid valve for driving said piston of said pneumatic cylinder to arrival at an end position of said piston of said pneumatic cylinder and a velocity of said piston on said arrival at said end position of said piston for each of load rates of said pneumatic cylinder based on at least said piston area of said head-end chamber, said piston area of said piston rod-end chamber, said effective area of said head-end tube passage of said pneumatic cylinder, and said effective area of said rod-end tube passage of said pneumatic cylinder inputted by said input means for each of a plurality of combinations of said solenoid valve, said speed controller, said pneumatic cylinder, and said tubes for connecting therebetween; and means for displaying, in a superimposed manner on a display unit, said stroke time of said piston and said velocity of said piston determined by said calculating means for each of said load rates for each of said plurality of combinations based on a stroke of said piston.

2. The simulation result displaying apparatus for the pneumatic device according to claim 1, wherein said calculating means calculates a change of mass flow of air flowing into said head-end chamber of said pneumatic cylinder based on movement of said piston, a volume change of said head-end chamber based on said change of said mass flow, a pressure change of said head-end chamber based on said volume change, an acceleration of said piston from said pressure change, and said velocity and a displacement of said piston from said acceleration.

3. The simulation result displaying apparatus for the pneumatic device according to claim 1, wherein said calculating means calculates a change of mass flow of air flowing out of said piston rod-end chamber of said pneumatic cylinder based on movement of said piston, a volume change of said piston rod-end chamber based on said change of said mass flow, a pressure change of said piston rod-end chamber based on said volume change, an acceleration of said piston from said pressure change, and said velocity and a displacement of said piston from said acceleration.

* * * * *